(12) United States Patent
Leatherman et al.

(10) Patent No.: US 10,682,832 B2
(45) Date of Patent: Jun. 16, 2020

(54) FIRE-RATED ROOFING SYSTEM

(71) Applicant: Carlisle Intangible, LLC, Scottsdale, AZ (US)

(72) Inventors: Matthew John Leatherman, Carlisle, PA (US); Brian Gish, Carlisle, PA (US)

(73) Assignee: Carlisle Intangible Company, Syracuse, NY (US)

( * ) Notice: Subject to any disclaimer, the term of this patent is extended or adjusted under 35 U.S.C. 154(b) by 0 days.

(21) Appl. No.: 16/453,629

(22) Filed: Jun. 26, 2019

(65) Prior Publication Data

US 2019/0315101 A1    Oct. 17, 2019

Related U.S. Application Data

(63) Continuation of application No. 15/227,274, filed on Aug. 3, 2016, now Pat. No. 10,357,946.

(Continued)

(51) Int. Cl.
*B32B 27/06* (2006.01)
*B32B 5/24* (2006.01)
(Continued)

(52) U.S. Cl.
CPC .............. *B32B 27/06* (2013.01); *B32B 5/022* (2013.01); *B32B 5/024* (2013.01); *B32B 5/06* (2013.01); *B32B 5/24* (2013.01); *B32B 5/26* (2013.01); *B32B 7/04* (2013.01); *B32B 11/10* (2013.01); *B32B 15/04* (2013.01); *B32B 15/06* (2013.01); *B32B 15/082* (2013.01); *B32B 15/085* (2013.01); *B32B 15/14* (2013.01);
*B32B 15/18* (2013.01); *B32B 15/20* (2013.01); *B32B 19/06* (2013.01); *B32B 19/08* (2013.01); *B32B 25/14* (2013.01); *B32B 25/16* (2013.01);
(Continued)

(58) Field of Classification Search
CPC ....... B32B 27/06; B32B 15/04; B32B 27/304; B32B 27/32; B32B 2419/06; B32B 2307/3065; B32B 2262/106; B32B 5/26; B32B 5/06; B32B 5/022; B32B 5/024; B32B 5/028; B32B 5/026; B32B 15/14; E04D 5/10; E04D 5/04; E04D 11/02; E04D 1/28; E04B 1/941
See application file for complete search history.

(56) References Cited

U.S. PATENT DOCUMENTS 3,694,306 A * 9/1972 Fricklas ................ E04B 1/941
428/341
5,770,530 A * 6/1998 Nockemann .............. B32B 5/10
442/319

(Continued)

*Primary Examiner* — Jessie T Fonseca
(74) *Attorney, Agent, or Firm* — Wood Herron & Evans LLP

(57) ABSTRACT

A fire-resistant polymeric membrane includes a polymer layer such as PVC, TPO, or EPDM affixed to a carbon fiber composite. The carbon fiber composite includes one or two layers of non-woven carbon fibers and at least one of an inert fiber mat or a metal foil layer, wherein the metal foil layer has a melting temperature of at least about 660° C. The present invention also provides an underlayment, wherein the underlayment is formed from one or more fibrous carbon layers affixed to at least one of an inert fiber mat or a metal foil having a melting temperature greater than 660° C.

20 Claims, 3 Drawing Sheets

Related U.S. Application Data

(60) Provisional application No. 62/281,352, filed on Jan. 21, 2016.

(51) Int. Cl.

| | |
|---|---|
| *B32B 5/26* | (2006.01) |
| *B32B 7/04* | (2019.01) |
| *B32B 15/082* | (2006.01) |
| *B32B 15/085* | (2006.01) |
| *B32B 15/14* | (2006.01) |
| *B32B 15/18* | (2006.01) |
| *B32B 15/20* | (2006.01) |
| *B32B 19/06* | (2006.01) |
| *B32B 19/08* | (2006.01) |
| *B32B 25/16* | (2006.01) |
| *B32B 27/12* | (2006.01) |
| *B32B 5/02* | (2006.01) |
| *B32B 5/06* | (2006.01) |
| *B32B 11/10* | (2006.01) |
| *B32B 15/06* | (2006.01) |
| *B32B 25/14* | (2006.01) |
| *B32B 27/08* | (2006.01) |
| *B32B 27/30* | (2006.01) |
| *B32B 15/04* | (2006.01) |
| *B32B 27/32* | (2006.01) |
| *E04B 1/94* | (2006.01) |
| *E04D 5/04* | (2006.01) |
| *E04D 5/10* | (2006.01) |
| *E04D 11/02* | (2006.01) |
| *E04D 1/28* | (2006.01) |

(52) U.S. Cl.
CPC .............. *B32B 27/08* (2013.01); *B32B 27/12* (2013.01); *B32B 27/304* (2013.01); *B32B 27/308* (2013.01); *B32B 27/32* (2013.01); *E04B 1/941* (2013.01); *E04D 5/04* (2013.01); *E04D 5/10* (2013.01); *E04D 11/02* (2013.01); *B32B 2250/04* (2013.01); *B32B 2250/05* (2013.01); *B32B 2262/0269* (2013.01); *B32B 2262/0276* (2013.01); *B32B 2262/10* (2013.01); *B32B 2262/101* (2013.01); *B32B 2262/106* (2013.01); *B32B 2262/108* (2013.01); *B32B 2262/14* (2013.01); *B32B 2307/304* (2013.01); *B32B 2307/3065* (2013.01); *B32B 2307/50* (2013.01); *B32B 2307/546* (2013.01); *B32B 2307/718* (2013.01); *B32B 2307/7265* (2013.01); *B32B 2307/732* (2013.01); *B32B 2419/06* (2013.01); *E04D 1/28* (2013.01)

(56) References Cited

U.S. PATENT DOCUMENTS

| | | | |
|---|---|---|---|
| 2004/0229043 A1* | 11/2004 | Spohn | B29C 41/32 428/421 |
| 2005/0260379 A1* | 11/2005 | Verhaeghe | B29C 70/24 428/95 |
| 2008/0124576 A1* | 5/2008 | Elliott | C08G 59/027 428/702 |
| 2008/0248244 A1* | 10/2008 | Kalkanoglu | D06N 5/00 428/143 |
| 2013/0189471 A1* | 7/2013 | Ashelin | E04B 1/941 428/76 |
| 2015/0259919 A1* | 9/2015 | Lewis | C09D 175/04 428/116 |
| 2017/0260748 A1* | 9/2017 | Buhrman | B32B 5/18 |

* cited by examiner

FIRE-RATED ROOFING SYSTEM

CROSS REFERENCE TO RELATED APPLICATIONS

This application claims priority to and is a continuation application of U.S. patent application Ser. No. 15/227,274, filed Aug. 3, 2016, which in turn claims priority to U.S. Provisional Application No. 62/281,352, filed Jan. 21, 2016. This application also claims the benefit of U.S. Patent Application Publication U.S. 2017/0210100, the entirety of which is hereby incorporated by reference.

BACKGROUND OF THE INVENTION

Commercial roofs are rated based on fire resistance. The fire rating is based on the ability of the roof's surface to withstand one or more tests. To obtain a Class A over wood deck fire rating, a roofing system must pass ASTM E 108 (hereinafter, this is simply referred to as a Class A fire rating). In this test, combustible material is placed on the roof surface, ignited and allowed to burn. If the roof's structure does not sustain a flame, meets structural integrity requirements after the test is complete, and does not have holes larger than a certain size after the test, the roof system passes the test. A comparable test method is UL 790. Built-up roofs which are formed from bituminous material can pass this test by using multiple layers of a glass matting. The glass mats provide an inorganic barrier layer that prevents the fire from extending through the surface of the built up roof.

Membrane roofs which are formed from polymeric sheet membranes and, in particular, non-bituminous polymeric sheets, can achieve a UL Class A over wood deck rating. But the roof system is much more expensive. It requires a fireproof material such as gypsum board or fiberglass facers over an intumescent coating. The added expense often makes such roofs cost-prohibitive.

SUMMARY OF THE INVENTION

Embodiments of the present invention are premised on the realization that a roofing structure capable of achieving a Class A fire rating can be formed with a composite membrane. The composite membrane is formed from a non-bituminous polymeric sheet or membrane affixed to a carbon fiber composite. The carbon fiber composite includes one or two layers of a carbon fiber fabric affixed to at least one of an inert fiber mat or a flexible metal foil, wherein the metal foil has a melting temperature sufficiently high to prevent the roof deck from igniting. Generally a foil formed from a metal having a melting temperature of greater than 660° C. is suitable for use in embodiments of the present invention.

In particular, the carbon fiber composite can be formed with two layers of the carbon fiber fabric with the inert fiber mat and/or the metal foil positioned in between the two layers. Tufting fixes all three layers together. This structure is then affixed to the polymeric sheet.

The inert fiber mat can be, for example, glass scrim, woven glass fibers, asbestos, elastinite, basalt, and so on. The metal foil can be, for example, stainless steel, iron, galvanized iron, galvanized steel, titanium, aluminum, and so on.

Further, an alternate embodiment of the present invention encompasses an underlayment sheet formed from the carbon fiber layers affixed to a metal foil having a relatively high melting temperature. The structure can be used as an underlayment to achieve a fire-resistant roof wherein the underlayment is then covered with a waterproof layer, such as a polymeric sheet or even a bituminous layer.

The objects and advantages of present will be appreciated in light of the following detailed descriptions and drawings in which:

DETAILED DESCRIPTION OF THE INVENTION

Figure 1:
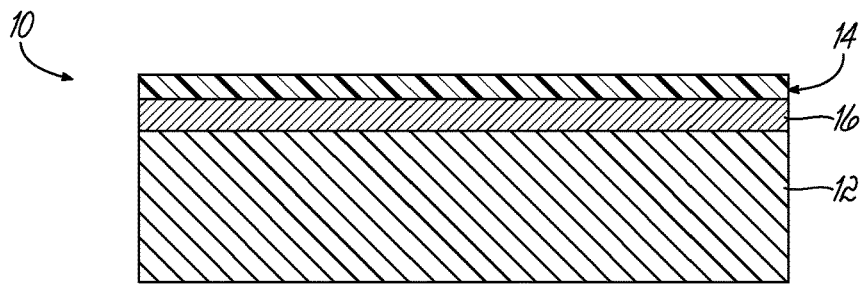
FIG. 1 is a cross-sectional view broken away of a composite roofing membrane having upper and lower layers on a roof deck.

According to one embodiment of the present invention, with reference to FIG. 1, a composite roofing membrane 10 suitable for use in the Class A fire rated roof structure is positioned on a roof deck 12. The roof deck 12 can be virtually any typical roof deck. It can include wood, such as a chipboard layer or any other sub-layers typical for a roof deck structure. The roof can be sloped or flat. The membrane 10 is fixed to the roof deck by any typical method such as adhesive bonding, mechanical fasteners, or ballast.

The composite roofing membrane 10 includes an upper layer 14 intended to be exposed to the elements and a lower layer 16 intended to rest on the roof deck 12. Layers 14 and 16 are generally coextensive with each other except on one edge as explained hereinafter. The upper layer 14 is a polymeric sheet material or membrane. Typically, these have a nominal thickness of 45 to 80 mils. However, thinner, as well as thicker, membranes will function. The polymeric membrane 14 can be formed from any typical polymer used as a roofing membrane. These include polyvinyl chloride (PVC), thermoplastic polyolefin (TPO), ethylene propylene monomer rubber (EPM), ethylene propylene diene monomer rubber (EPDM), chlorosulfonated polyethylene, such as Hypalon brand, flexible acrylics as well as others. Bituminous materials are not included within the definition of polymeric membranes.

Figure 2:
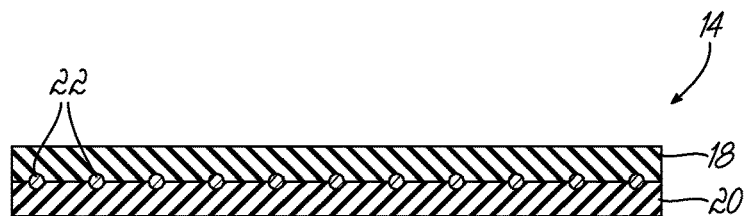
FIG. 2 is an enlarged cross-sectional view of an upper layer of the composite membrane shown in FIG. 1.

Typically, the polymeric membrane 14 is actually two plies affixed together, an upper ply 18 and a lower ply 20 as shown in FIG. 2. Both plies are generally formed from the same polymeric material. Polymeric membrane 14, as shown, includes a reinforcing mesh 22, such as a polyester mesh or glass scrim, positioned at an interface between upper ply 18 and lower ply 20. This is optional and is used only when a reinforced sheet is desired for physical strength. The glass scrim can also improve fire resistance.

Figure 3A:
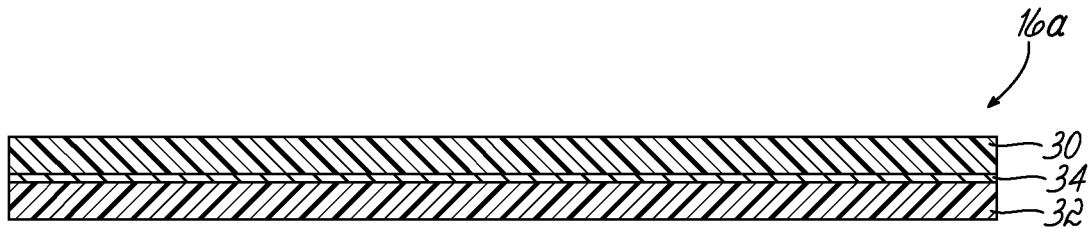
FIG. 3A is an enlarged view broken away of a lower layer of the composite membrane shown in FIG. 1.
Figure 3B:
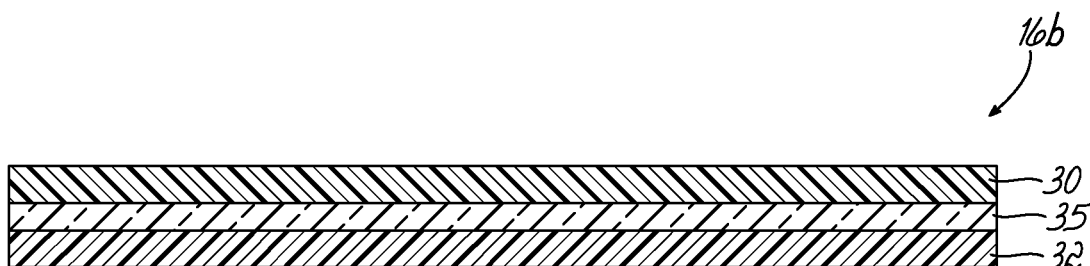
FIG. 3B is an enlarged view similar to FIG. 3A showing an alternate structure of the lower layer.

The lower layer 16 of composite 10 is a composite including at least one carbon fiber sheet or layer and at least one of a metal foil or an inert fiber mat. With reference to FIGS. 3A and 3B, lower layer 16 can be a three layer structure. As shown in FIG. 3A, layer 16(*a*) includes upper and lower carbon fiber layers 30 and 32 with a metal foil 34 sandwiched between the two layers 30, 32. As shown in FIG. 3B, layer 16(*b*) includes upper and lower carbon fiber layers 30 and 32 with an inert fiber mat 35 sandwiched therebetween. With further reference to FIG. 3B, in an embodiment, one of the two layers 30, 32 may represent a metal foil layer.

Figure 3C:
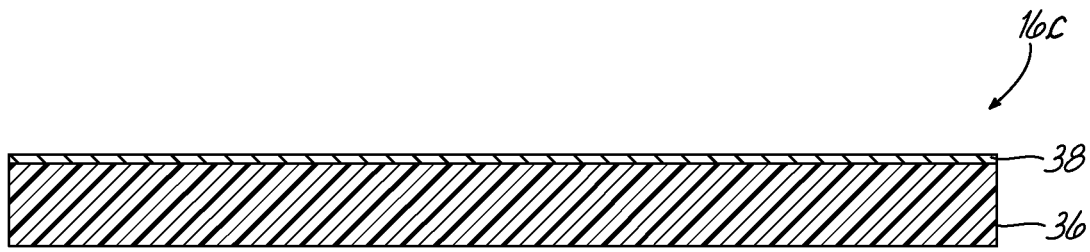
FIG. 3C is an enlarged view similar to FIG. 3A showing another alternate structure of the lower layer.
Figure 3D:
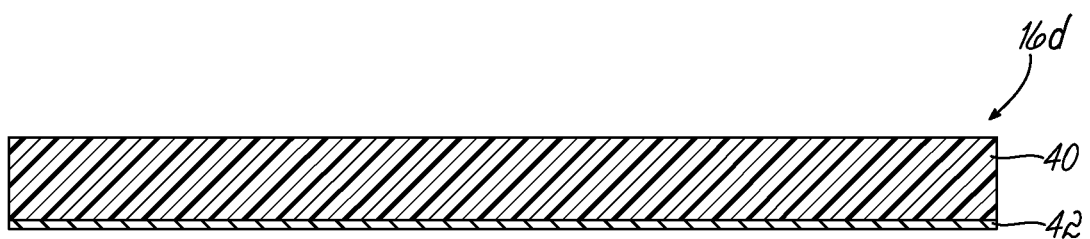
FIG. 3D is an enlarged view similar to FIG. 3A showing another alternate structure of the lower layer.

With reference to FIGS. 3C and 3D, the lower layer 16 can be formed with two layers. As shown in FIG. 3C, a lower layer 16(*c*) includes a first, bottom layer 36 of carbon fiber and a second, top layer 38, which is a metal foil or an inert fiber mat. The top layer 38 is intended to be affixed directly to the polymeric membrane 14. Alternately, as shown in FIG. 3D, a lower layer 16(*d*) can have a first, top layer 40 of carbon fiber and a second, bottom layer 42, which may be a metal foil or an inert fiber mat.

The carbon fiber layer(s) have a combined basis weight effective to provide sufficient thermal insulation to prevent a fire from igniting the roof deck. Generally, for use in embodiments of the present invention, the combined weight of the carbon fiber layers should be at least 3 ounces per square yard (oz/yd$^2$) (100 gsm), or 6 oz/yd$^2$ (200 gsm), more precisely 9 to 20 oz/yd$^2$ (300 to 667 gsm or higher), and, in particular, 9 to 15 oz/yd$^2$ (300 to 500 gsm). In an embodiment where the composite includes two carbon fiber layers, one of the carbon fiber layers may have a weight that is greater than the weight of the other of the carbon fiber layers. For example, with reference to FIG. 3A, the carbon fiber layer 30 may have a weight of 3 to 5 oz/yd$^2$, and the carbon fiber layer 32 may have a weight of 5 to 7 oz/yd$^2$.

The carbon fibers can be formed in any manner. In particular, carbon fibers formed by reducing polymeric fibers to form carbon are particularly suitable for use in embodiments of the present invention, in particular, fibers formed from polyacrylonitrile. However, carbon fibers formed from other polymers will work in embodiments of the present invention. The carbon fiber can be any fire-resistant carbon fiber. These include ox fibers, such as oxidized polyacrylonitrile fiber. They can also be fully oxidized carbon fibers. Further, they can be graphite fiber. The ox fibers are less expensive and provide adequate fire resistance and insulation.

Further, the carbon fiber layer can include other inert or fire-resistant fibers such as mineral fibers (e.g., basalt), glass fibers, or aramid fibers. Thus, the percentage of carbon fibers in the carbon fiber layer may vary. The percentage of carbon fibers in the carbon fiber layer may be, for example, greater than 25%, greater than 50%, greater than 60%, or greater than 70%. But the carbon fiber layers should have a sufficient amount of carbon fibers to prevent ignition. One commercially available carbon fiber web is Pyron brand available from Zoltek Incorporated. Notably, the thickness of the carbon fiber layer may increase as the percentage of carbon fibers decreases. Further, the carbon fiber layer, or another layer in the composite, may include organic or inorganic flame retardant additives.

The carbon fibers can be held together to form sheets using various well-known methods. In particular, tufting can be employed to fix the fibers together. This method does not incorporate adhesives into the carbon fiber layer(s) that could ignite during a fire. Further, tufting can be used to bind the carbon fiber layer(s) and any intervening layers (e.g., a metal foil and/or an inert fiber mat) together. In an embodiment, threads are woven through the lower layer of the composite to hold all of the layers together.

The metal foil (e.g., metal foil 34 or 42) for use in embodiments of the present invention has a melting temperature high enough to prevent a fire which burns through the polymeric membrane 14 from igniting the roof deck. Any metal foil which has a melting temperature greater than about 660° C. should be suitable for use in embodiments of the present invention. Metal foils having higher melting temperatures, such as at least 800° C., 900° C., 1000° C., 1100° C., 1200° C., or 1300° C. or higher, provide added protection. Such metals includes, for example, aluminum, cast iron, chromium, Inconel, iron, manganese, nickel, stainless steel, high carbon steel, medium carbon steel, low carbon steel, titanium, copper, and tungsten. A galvanizing coating may be required over iron or steel to prevent rusting. This list of metal foils is exemplary and any metal foil that has the requisite melting temperature and can be formed into a foil is suitable for use in embodiments of the present invention. The metal foil must be thin enough to be flexible and thick enough to protect the roof surface. The thickness of the metal foil may vary depending at least in part on the type of metal used for the foil. Generally, the metal foil may be relatively thin having a thickness of 0.0003" (0.0075 mm) to 0.004" (0.1 mm), in particular 0.002" (0.05 mm). Additionally, the metal foil may be relatively thick having a thickness between 0.04" (1 mm) and 0.06" (1.5 mm).

The fiber mat (e.g., inert fiber mat 35) for use in embodiments of the present invention is an inert, inorganic fiber mat. The fiber mat may be, for example, woven or spun-bond. The fiber mat may be formed from a number of materials including a glass scrim, woven glass fibers, asbestos, elastinite, and basalt. The weight of the fiber mat may range from, for example, 10 to 200 grams per square meter (g/m$^2$) or more. Various embodiments may include an inert fiber mat having a weight of 10 g/m$^2$, 20 g/m$^2$, 30 g/m$^2$, 45 g/m$^2$, or 70 g/m$^2$. However, thinner, as well as thicker, fiber mats will function. Further, the fiber mat may be made of one or more layers of inert, inorganic material.

The composite roofing membrane 10 can be formed by bonding together the polymeric membrane 14 to lower layer 16. For example, a thermoplastic membrane can be heat-bonded to lower layer 16. An exemplary method of bonding a polymeric sheet to a fibrous web is disclosed, for example, in Venable U.S. Pat. No. 5,456,785.

Figure 4:
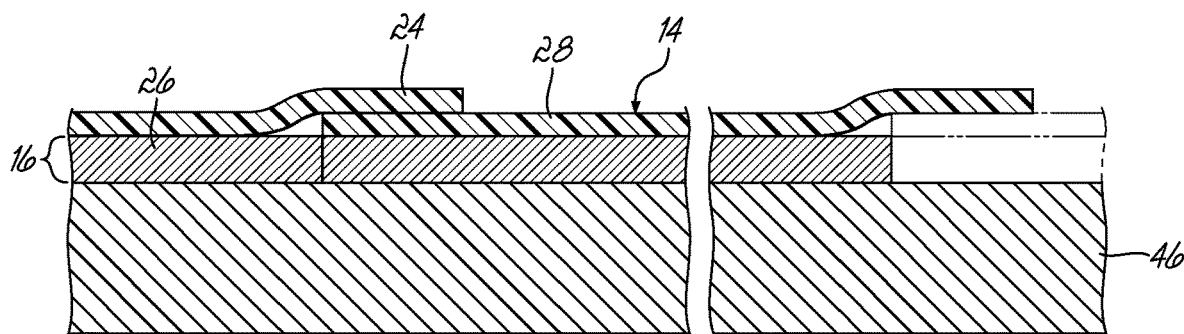
FIG. 4 is a cross-sectional view of two adjacent composite membranes.

As shown in FIG. 1, a roof structure according to an embodiment of the present invention includes roof deck 12, which is covered with the composite membrane 10. Generally, the composite membranes 10 will be narrower than the roof deck structure and therefore multiple membranes 10 need to be adhered together to cover the entire roof. Therefore, polymeric membrane 14 can be slightly wider (e.g., 6 to 8 inches) than carbon fiber composite layer 16. This provides polymeric membrane 14 with an edge portion 24 which is the polymeric sheet by itself, without any underlying carbon fiber composite. As shown in FIG. 4, the edge portion 24 from a first composite roof membrane 26 can be affixed to a polymeric membrane 14 on an adjacent sheet 28. Thus, "coextensive" as used in the present application is intended to indicate that the vast majority of the polymeric membrane 14 is adhered to layer 16; however, as discussed previously, composite membrane 10 can include a narrow uncoated edge 24 which permits adjacent sheets to be fixed together.

The composite roofing membrane 10 is fixed to the roof deck by any well known method, such as by an adhesive (not shown) between the bottom surface of membrane 10 and the top surface of roof deck 12 or by use of mechanical fasteners (not shown). Basically, any method of maintaining a membrane in position on a roof deck can be utilized in embodiments of the present invention.

Figure 5:
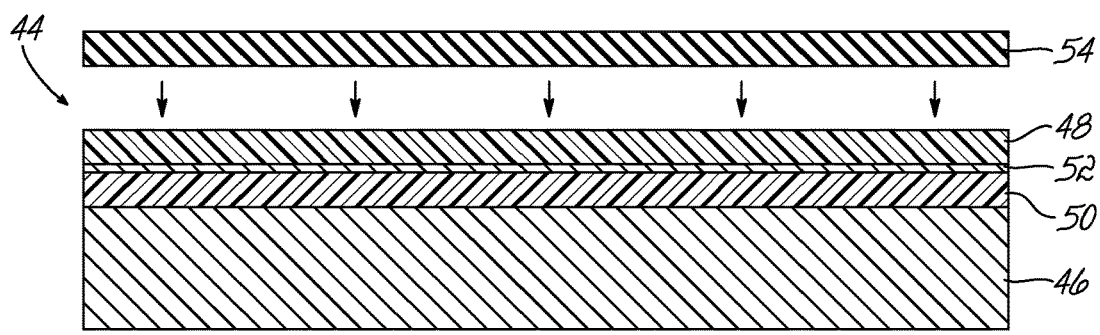
FIG. 5 is a cross-sectional view of an alternative embodiment of the present invention incorporated into a roof structure.

An alternate embodiment of the present invention is shown in FIG. 5. This embodiment comprises an underlayment 44 for a roof structure, which can be used in combination with any known polymeric roof membrane or other waterproofing layer, such as a bituminous material. The underlayment 44 includes upper and lower carbon fiber layers 48, 50, identical to layers 30, 32 in FIG. 3A. Sandwiched between these layers is metal foil 52. Again, metal foil 52 is identical to layer 34 in FIG. 3A. These may be affixed together as previously described and typically are affixed together by tufting or other techniques known in the art. The underlayment is applied to a roof deck 46 and covered with a waterproofing layer 54 such as a membrane sheet or bituminous material to provide a roof structure that has a Class A fire rating. The underlayment 44 can also have the structure shown in FIG. 3B or 3C.

Lower layer 16 or underlayment 44 can be modified yet still be within the scope of the present invention. Various configurations of carbon fiber layers, inert fiber mat layers, and/or metal foil layers can be used. For example, one carbon fiber layer could be affixed to two metal foil layers, one on one side and one on the other side. Three or more carbon fiber layers could be affixed together, separated by two or more inert fiber mat layers and/or metal foil layers. Two or more different metal foils could be used, for example, one made of stainless steel and one made of titanium.

Figure 6:
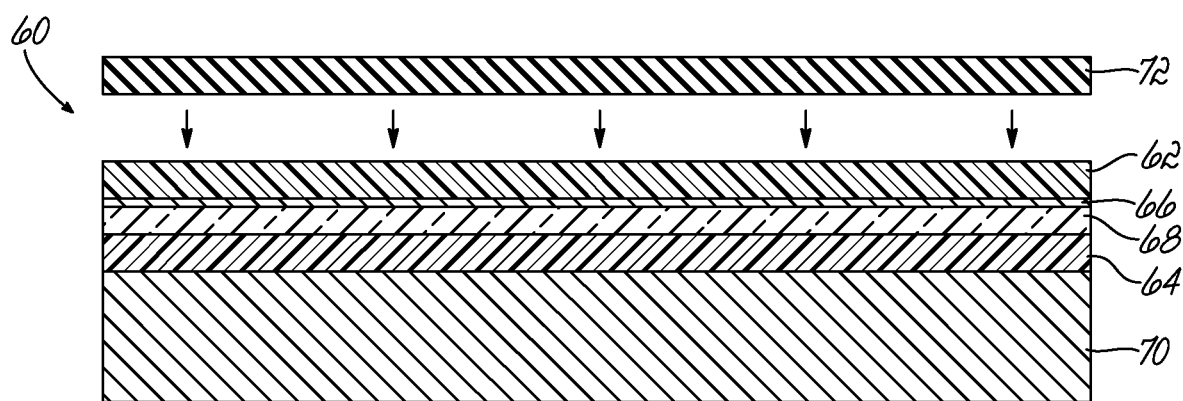
FIG. 6 is a cross-sectional view of an alternative embodiment of the present invention incorporated into a roof structure.

In an alternate embodiment, a composite roofing membrane is shown in FIG. 6. This embodiment comprises an underlayment 60 for a roof structure, which can be used in combination with any known polymeric roof membrane or other waterproofing layer, such as a bituminous material. The underlayment 60 includes upper and lower carbon fiber layers 62 and 64, which are identical to layers 30 and 32 in FIG. 3A. Sandwiched between these layers are a metal foil layer 66 and an inert fiber mat 68. Metal foil layer 66 is identical to layer 34 in FIG. 3A, and inert fiber mat 68 is identical to layer 35 in FIG. 3B. These may be affixed together as previously described and typically are affixed together by tufting or other techniques known in the art. The underlayment 60 is applied to a roof deck 70 and covered with a waterproofing layer 72 such as a membrane sheet or bituminous material to provide a roof structure that has a Class A fire rating. The underlayment 60 can also have metal foil layer 66 and inert fiber mat 68 reversed (not shown) such that inert fiber mat 68 is closer to waterproofing layer 72. Further, in an embodiment, a third carbon fiber layer (not shown) may be positioned between metal foil layer 66 and inert fiber mat 68.

To test an embodiment of the present invention, a composite roofing membrane as shown in FIG. 1 was formed with a PVC membrane. On the bottom side of the PVC membrane was a nonwoven carbon fiber fabric (9 oz/yd$^2$), an inert glass scrim layer, and a layer of 2 mil thick 304 stainless steel. This was placed on a wood deck and tested according to ASTM E 108 and achieved a class A rating.

Embodiments of the present invention described herein permit one to form a Class A fire rated roof structure. Further, the structure, even when formed with a polymeric membrane, is cost-effective and competitive with fire-rated built-up roof structures.

This has been a description of embodiments of the present invention along with the preferred method of practicing embodiments of the present invention.

However, the invention itself should only be defined by the appended claims wherein we claim:

1. A fire-resistant composite comprising:
   a first layer comprising a flexible polymeric sheet comprising an upper ply and a lower ply, the first layer further comprising a reinforcing material wherein the reinforcing material is located between the upper ply and the lower ply; and
   a second layer, the second layer comprising at least one carbon fiber sheet and at least one of an inert fiber mat or a metal foil, the metal foil having a melting temperature above about 660° C.

2. The fire-resistant composite claimed in claim 1 wherein the first layer is affixed to the second layer to form a composite sheet.

3. The fire-resistant composite claimed in claim 1 wherein the second layer comprises first and second carbon fiber sheets with the at least one of the inert fiber mat or the metal foil positioned between the first and second carbon fiber sheets.

4. The fire-resistant composite claimed in claim 1 wherein the metal foil is selected from the group consisting of aluminum, stainless steel, iron, iron alloys, titanium, nickel, chromium, tungsten, and copper.

5. The fire-resistant composite claimed in claim 1 wherein the metal foil has a melting temperature of at least 1100° C.

6. The fire-resistant composite claimed in claim 1 wherein the flexible polymeric sheet is selected from the group consisting of polyvinyl chloride (PVC), thermoplastic polyolefin (TPO), ethylene propylene monomer rubber (EPM), ethylene propylene diene monomer rubber (EPDM), chlorosulfonated polyethylene, and flexible acrylics.

7. The fire-resistant composite claimed in claim 1 wherein the at least one carbon fiber sheet has a combined basis weight of at least 3 ounces per square yard.

8. The fire-resistant composite claimed in claim 1 wherein the at least one carbon fiber sheet has a combined basis weight of at least 6 ounces per square yard.

9. The fire-resistant composite claimed in claim 1 wherein the at least one carbon fiber sheet has a combined basis weight of at least 9 ounces per square yard.

10. The fire-resistant composite claimed in claim 1 wherein the at least one carbon fiber sheet has a combined basis weight of between 9 ounces per square yard and 20 ounces per square yard, inclusively.

11. A fire-resistant composite comprising:
    a first layer comprising a flexible polymeric sheet and a reinforcing material, wherein the reinforcing material is a mesh; and
    a second layer, the second layer comprising at least one carbon fiber sheet and at least one of an inert fiber mat or a metal foil, the metal foil having a melting temperature above about 660° C.

12. The fire-resistant composite claimed in claim 11 wherein the first layer is affixed to the second layer to form a composite sheet.

13. The fire-resistant composite claimed in claim 11 wherein the second layer comprises first and second carbon fiber sheets with the at least one of the inert fiber mat or the metal foil positioned between the first and second carbon fiber sheets.

14. The fire-resistant composite claimed in claim 11 wherein the metal foil is selected from the group consisting of aluminum, stainless steel, iron, iron alloys, titanium, nickel, chromium, tungsten, and copper.

15. The fire-resistant composite claimed in claim 11 wherein the metal foil has a melting temperature of at least 1100° C.

16. The fire-resistant composite claimed in claim 11 wherein the flexible polymeric sheet is selected from the group consisting of polyvinyl chloride (PVC), thermoplastic polyolefin (TPO), ethylene propylene monomer rubber (EPM), ethylene propylene diene monomer rubber (EPDM), chlorosulfonated polyethylene, and flexible acrylics.

17. The fire-resistant composite claimed in claim 11 wherein the at least one carbon fiber sheet has a combined basis weight of at least 3 ounces per square yard.

18. The fire-resistant composite claimed in claim 11 wherein the at least one carbon fiber sheet has a combined basis weight of at least 6 ounces per square yard.

19. The fire-resistant composite claimed in claim 11 wherein the at least one carbon fiber sheet has a combined basis weight of at least 9 ounces per square yard.

20. A fire-resistant composite comprising:
   a first layer comprising a flexible polymeric sheet, the first layer comprising a reinforcing material;
   a second layer comprising first and second carbon fiber sheets with a metal foil or an inert fiber mat positioned between the first and second carbon fiber sheets, the metal foil having a melting temperature above about 660° C.; and
wherein the composite passes ASTM E 108 and is configured to be installed on a roof exterior.

* * * * *